US012214541B2

(12) United States Patent
Boromand et al.

(10) Patent No.: US 12,214,541 B2
(45) Date of Patent: Feb. 4, 2025

(54) DRAWABILITY ENHANCEMENT IN POLYMER THIN FILMS

(71) Applicant: META PLATFORMS TECHNOLOGIES, LLC, Menlo Park, CA (US)

(72) Inventors: Arman Boromand, Issaquah, WA (US); Andrew John Ouderkirk, Kirkland, WA (US); Sheng Ye, Redmond, WA (US); Christopher Yuan Ting Liao, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 226 days.

(21) Appl. No.: 17/730,371

(22) Filed: Apr. 27, 2022

(65) Prior Publication Data
US 2023/0173741 A1    Jun. 8, 2023

Related U.S. Application Data

(60) Provisional application No. 63/286,431, filed on Dec. 6, 2021.

(51) Int. Cl.
| B29C 55/14 | (2006.01) |
| B29C 43/00 | (2006.01) |
| B29C 43/24 | (2006.01) |
| B29C 55/00 | (2006.01) |
| B29K 23/00 | (2006.01) |
| B29L 7/00 | (2006.01) |

(52) U.S. Cl.
CPC ............ *B29C 55/14* (2013.01); *B29C 43/003* (2013.01); *B29C 43/24* (2013.01); *B29C 55/005* (2013.01); *B29K 2023/0658* (2013.01); *B29L 2007/008* (2013.01)

(58) Field of Classification Search
CPC .............................. B29C 55/14; B29C 55/143
See application file for complete search history.

(56) References Cited

U.S. PATENT DOCUMENTS

| 2010/0026940 A1* | 2/2010 | Takegami | ............... | B29C 55/00 |
| | | | | 264/1.6 |
| 2014/0205826 A1* | 7/2014 | Steeman | ............... | B29C 43/003 |
| | | | | 428/339 |

(Continued)

FOREIGN PATENT DOCUMENTS

| JP | 2016051890 A | 4/2016 |
| WO | 2010104196 A1 | 9/2010 |

OTHER PUBLICATIONS 2016051890 machine translation (Year: 2016).*

(Continued)

*Primary Examiner* — S. Behrooz Ghorishi
*Assistant Examiner* — Alexander A Wang
(74) *Attorney, Agent, or Firm* — Greenberg Traurig, LLP

(57) ABSTRACT

A method includes applying a stress to a polymer thin film to stretch the polymer thin film along a first in-plane direction, and subsequently applying a stress to the polymer thin film to stretch the polymer thin film along a second in-plane direction orthogonal to the first in-plane direction to form an ultra-high modulus polymer thin film. Calendaring or hot pressing of the ultra-high modulus polymer thin film may improve its optical and/or thermal properties.

7 Claims, 8 Drawing Sheets

(56) References Cited

U.S. PATENT DOCUMENTS

| | | | |
|---|---|---|---|
| 2022/0354032 A1* | 11/2022 | Graff | H01F 1/28 |
| 2023/0068420 A1 | 3/2023 | Mullen et al. | |
| 2023/0323048 A1* | 10/2023 | Li | B32B 27/308 |
| | | | 524/427 |

OTHER PUBLICATIONS

International Search Report and Written Opinion for International Application No. PCT/US2022/051371, mailed Sep. 19, 2023, 13 pages.

Invitation to Pay Additional Fees for International Application No. PCT/US2022/051371 mailed Jul. 28, 2023, 9 pages.

* cited by examiner

DRAWABILITY ENHANCEMENT IN POLYMER THIN FILMS

CROSS-REFERENCE TO RELATED APPLICATION

This application claims the benefit of priority under 35 U.S.C. § 119(e) of U.S. Provisional Application No. 63/286,431, filed Dec. 6, 2021, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
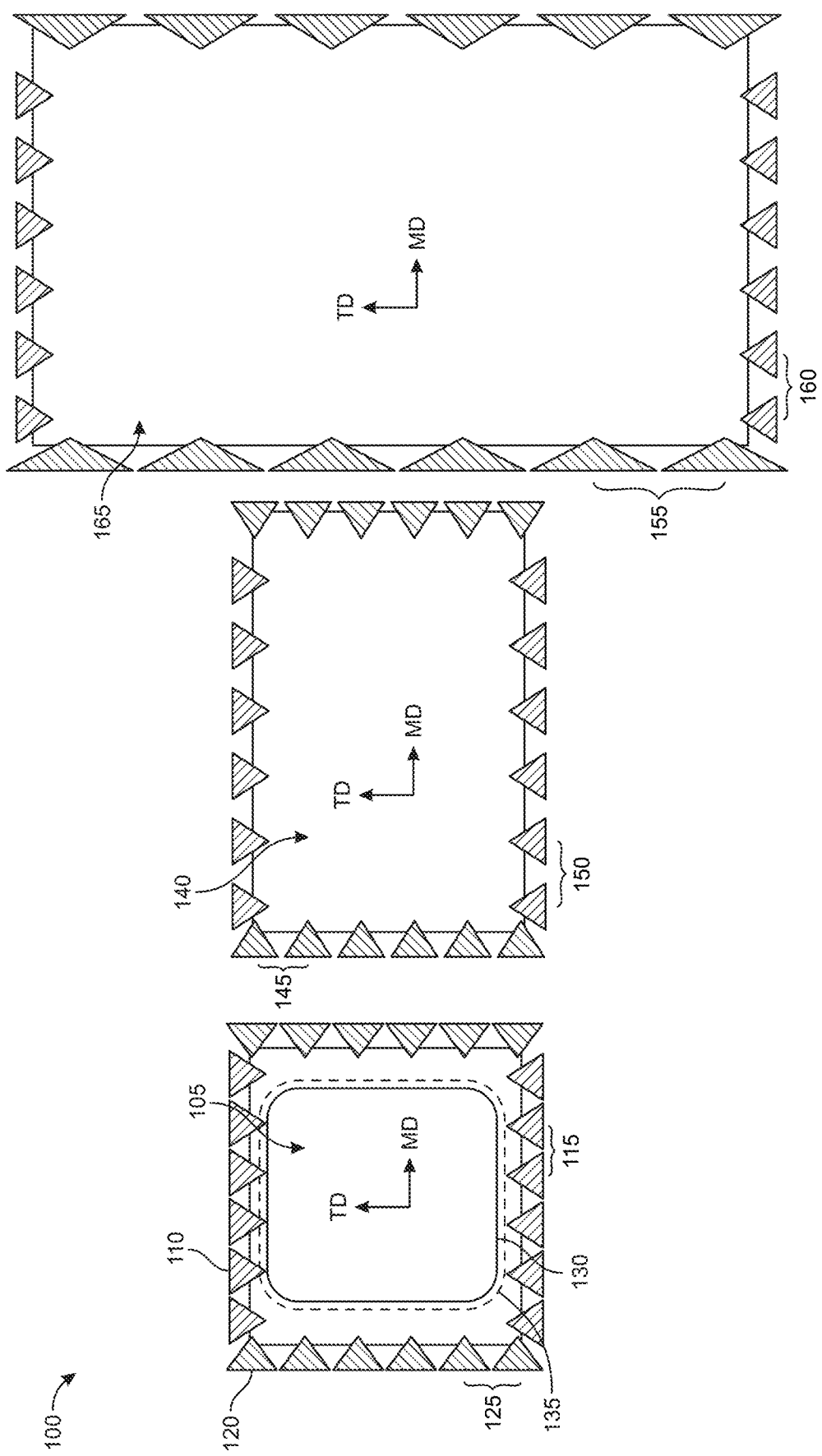
FIG. 1 is a schematic illustration of an orthogonal consecutive stretching (OCS) apparatus and method for deforming and orienting a polymer thin film according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polymer materials may be incorporated into a variety of different optic and electro-optic systems, including passive and active optics and electroactive devices. Lightweight and conformable, one or more polymer layers may be incorporated into wearable devices such as smart glasses and are attractive candidates for emerging technologies including virtual reality/augmented reality devices where a comfortable, adjustable form factor is desired.

Virtual reality (VR) and augmented reality (AR) eyewear devices or headsets, for instance, may enable users to experience events, such as interactions with people in a computer-generated simulation of a three-dimensional world or viewing data superimposed on a real-world view. By way of example, superimposing information onto a field of view may be achieved through an optical head-mounted display (OHMD) or by using embedded wireless glasses with a transparent heads-up display (HUD) or augmented reality (AR) overlay. VR/AR eyewear devices and headsets may be used for a variety of purposes. For example, governments may use such devices for military training, medical professionals may use such devices to simulate surgery, and engineers may use such devices as design visualization aids.

These and other applications may leverage one or more characteristics of polymer materials, including the refractive index to manipulate light, thermal conductivity to manage heat, and mechanical strength and toughness to provide light-weight structural support.

Polymer thin films exhibiting optical anisotropy may be incorporated into a variety of systems and devices, including birefringent gratings, reflective polarizers, optical compensators and optical retarders for systems using polarized light such as liquid crystal displays (LCDs). Birefringent gratings may be used as optical combiners in augmented reality displays, for example, and as input and output couplers for waveguides and fiber optic systems. Reflective polarizers may be used in many display-related applications, particularly in pancake optical systems and for brightness enhancement within display systems that use polarized light. For orthogonally polarized light, pancake lenses may use reflective polarizers with extremely high contrast ratios for transmitted light, reflected light, or both transmitted and reflected light.

The degree of optical anisotropy achievable through comparative thin film manufacturing processes is typically limited, however, and is often exchanged for competing thin film properties such as flatness, toughness and/or film strength. For example, highly anisotropic polymer thin films often exhibit low strength in one or more in-plane direction, which may challenge manufacturability and limit throughput.

Notwithstanding recent developments, it would be advantageous to provide mechanically robust, optically anisotropic polymer thin films that may be incorporated into various optical systems including display systems for artificial reality applications. The instant disclosure is thus directed generally to optically anisotropic polymer articles and their methods of manufacture, and more specifically to systems for applying temporally specific tensile stresses to a polymer article to induce a desired optical and/or mechanical anisotropy. According to various embodiments, as used herein, a "polymer article" may include a polymer thin film or fiber. Moreover, although various embodiments may be disclosed with particular reference to a polymer thin film, reference also to a polymer fiber is implied unless the context clearly indicates otherwise.

The optical, thermal, and mechanical response of a polymer article may be determined by its chemical composition, the chemical structure of the polymer repeat unit, its density and extent of crystallinity, as well as the alignment of the crystals and/or polymer chains throughout the polymer matrix. Among these factors, the crystal or polymer chain alignment may dominate. In crystalline or semi-crystalline polymer thin films, an optical, thermal, or mechanical property or condition may be correlated to the degree or extent of crystal orientation, whereas the degree or extent of chain entanglement may create comparable optical, thermal, or mechanical properties in amorphous polymer thin films.

An applied stress may be used to form a preferred alignment of crystals or polymer chains within a polymer thin film and induce a corresponding modification of the optical, thermal, and/or mechanical properties along different directions of the film. As disclosed further herein, during processing where a polymer thin film is stretched to induce a preferred alignment of crystals/polymer chains and an attendant modification of the refractive index/birefringence, thermal, and mechanical properties, Applicants have shown that one approach to forming an anisotropic material is to modify the kinetics of the stretching process.

Stretching may include the application of a uniaxial or biaxial stress. Stretching may include a single act of stretching or plural, successive stretching events, such as along different in-plane directions of a polymer thin film. The act of stretching may be velocity limited or strain rate limited. In some embodiments, a polymer thin film may be stretched at a variable or constant velocity. In some embodiments, the polymer may be stretched using a variable strain rate or a constant strain rate (e.g., 0.5 $s^{-1}$, 1 $s^{-1}$, 5 $s^{-1}$, or 10 $s^{-1}$, including ranges between any of the foregoing values). By way of example, the strain rate may decrease throughout an act of stretching and/or amongst different stretching events from an initial strain rate (e.g., 5 $s^{-1}$) to a final strain rate (e.g., 0.5 $s^{-1}$).

In accordance with particular embodiments, Applicants have developed a polymer thin film/fiber manufacturing method for forming an optical quality polyethylene (PE) thin film having desired optical clarity and strength. Applicants have demonstrated that high quality, high performance single layer and multilayer polymer thin films having improved drawability and enhanced optical, thermal, and mechanical properties may be formed by implementing stretching processes throughout one or more stages of thin film manufacture, including the acts of forming, pre-orienting, and final stretching.

Polymer thin films/fibers may be formed using casting operations such as melt extrusion, compression molding, solvent casting, gel casting, and the like. Applicants have demonstrated that enhanced drawability may be achieved by tuning one or more of the draw temperature and the draw rate of a cast polymer thin film. In some examples, the draw temperature may be correlated to the thin film's primary (glass, or alpha) relaxation and/or its low temperature (beta) relaxation.

In some embodiments, polyethylene may be provided in particulate or powder form. Example polyethylene powders may have a particle size distribution (d90) greater than approximately 50 micrometers, e.g., greater than 50, 100, 200, or 300 micrometers, including ranges between any of the foregoing values.

A low molecular weight additive may be provided in particulate or powder form. Example additives, e.g., waxes, may have a particle size distribution (d90) less than approximately 30 micrometers, e.g., 5, 10, 15, 20, or 25 micrometers, including ranges between any of the foregoing values.

In some embodiments, particulate or powdered polyethylene may be mixed with a particulate or powdered wax in a long continuous mixer (LCM) at any suitable temperature. For instance, a mixing temperature may be less than, equal to, or greater than a melting temperature of the wax. The mixing may be adapted to impregnate the polyethylene with the wax to form a homogeneous mixture prior to casting.

In some examples, a mixture of "unentangled" polyethylene and low molecular weight additive may be extruded at a temperature less than approximately 140° C. (e.g., 120° C. or 130° C.) and above the melting point of the additive to form a polymer thin film. An extruded thin film may have a thickness of less than approximately 2 mm (e.g., 500 micrometers, 750 micrometers, or 1 mm, including ranges between any of the foregoing values) and a porosity of less than approximately 10% (e.g., less than 5%, less than 2%, or less than 1%).

In example melt extrusion methods, the melt may undergo pre-orientation with a draw down ratio (DDR) of at least approximately 1, e.g., approximately 1, approximately 2, approximately 3, or approximately 4, including ranges between any of the foregoing values. The melt may be collected on a chilled roller. The roller temperature may be less than (e.g., at least approximately 10° C. less than) the lowest melting point of any additive included in the melt. The cast polymer may undergo a machine direction orientation (MDO) process to form a hard cast film having a draw ratio along the machine direction (MDX) of at least approximately 2, e.g., at least approximately 2, at least approximately 4, or at least approximately 6, including ranges between any of the foregoing values.

According to further embodiments, a polymer article may be formed via gel casting from a dilute solution including a polymer composition and a first solvent followed by removal of the solvent. Example solvents include poor solvents such as mineral oils, paraffin oil, stearic acid, p-xylene, dodecanol, and the like. The first solvent may be removed prior to, during, and/or after the act(s) of stretching. The first solvent may be removed directly by evaporation, or through contact with a miscible second solvent followed by evaporation of the resulting co-solvent.

A cast polymer thin film may be stretched using single or multiple stretching events. Some stretching processes may include two successive stretching events. For instance, orthogonal consecutive stretching (OCS) may be used to develop structural fingerprints, such as smaller lamellar thicknesses and higher degrees of polymer chain orientation at draw ratios less than the draw ratios used to achieve similar structural fingerprints via comparative single stretching (SS) or parallel consecutive stretching (PCS) techniques. Orthogonal consecutive stretching may include first stretching a polymer thin film along a first in-plane axis, and then subsequently stretching the polymer thin film along a second in-plane axis that is orthogonal to the first in-plane axis.

In an example method, a cast polymer thin film may be stretched along a first in-plane axis to a stretch ratio of up to approximately 4 (e.g., 2, 3, or 4, including ranges between any of the foregoing values) with an attendant relaxation in the cross-stretch direction having a relaxation ratio of at least approximately 0.2 (e.g., 0.2, 0.3, 0.4, or 0.5, including ranges between any of the foregoing values). Subsequently, the polymer thin film may be stretched along a second in-plane axis orthogonal to the first in-plane axis to a stretch ratio of at least approximately 7 (e.g., 7, 10, 20, 30, 40, 50, or 60, including ranges between any of the foregoing values) with a relaxation ratio in the cross-stretch direction of at least approximately 0.2 (e.g., 0.2, 0.3, 0.4, or 0.5, including ranges between any of the foregoing values).

In some examples, the draw ratio in the first stretching step may be less than the draw ratio in the second stretching step. According to further embodiments, the temperature of the polymer thin film during the second stretching step may be greater than the polymer thin film temperature during the first stretching step. The temperature during the second stretching step may be at least approximately 5° C. greater than the temperature during the first stretching step (e.g., 5, 10, 15, or 20° C. greater, including ranges between any of the foregoing values).

In some embodiments, a polymer thin film may be heated and stretched along a first direction, cooled, and then heated and stretched along a second direction. In some embodiments, a polymer thin film may be heated and stretched along a first direction, cooled, and then heated and stretched again along the first direction. Following the second stretching step, the polymer thin film may be cooled. The acts of cooling may immediately follow the first (or second) stretching steps, where the polymer thin film may be cooled within approximately 10 seconds following completion of the first (or second) stretching step. In some examples, the temperature of the polymer thin film during an act of stretching may be greater than the glass transition temperature of the polymer. In some examples, the temperature of the polymer thin film during an act of stretching may be less than, equal to, or greater than the melting onset temperature of the polymer.

In various examples, the extent of relaxation perpendicular to the stretch direction may be approximately equal to the square root of the stretch ratio in the stretch direction. In some embodiments, the extent of relaxation may be substantially constant throughout the stretching process(es). In further embodiments, the extent of relaxation may decrease, with greater relaxation associated with the beginning of a stretch step and lesser relaxation associated with the end of a stretch step.

An example polymer may include ultra-high molecular weight polyethylene (UHMWPE). According to some embodiments, the optical properties of UHMWPE may be improved in conjunction with the processing methods disclosed herein by decreasing or eliminating surface and/or bulk defects. In some embodiments, one or more low melting point additives may be incorporated into the polymer matrix of a polymer thin film.

Example polyethylene materials include high molecular weight polyethylene, high density polyethylene, ultra-high molecular weight polyethylene, as well as derivatives and mixtures thereof, and may have a molecular weight (e.g., weight-averaged molecular weight) of at least approximately 100,000 g/mol, e.g., at least approximately 100,000 g/mol, or at least approximately 250,000 g/mol. Ultra-high molecular weight polyethylene may have a molecular weight of at least approximately 300,000 g/mol, e.g., approximately 300,000 g/mol, approximately 400,000 g/mol, approximately 500,000 g/mol, approximately 600,000 g/mol, approximately 700,000 g/mol, approximately 800,000 g/mol, approximately 900,000 g/mol, approximately 1,000,000 g/mol, approximately 2,000,000 g/mol, or approximately 5,000,000 g/mol, including ranges between any of the foregoing values.

In some embodiments, a polymer article may include a low molecular weight additive. The additive may include a low molecular weight polyethylene or polyethylene oligomer and may constitute from approximately 1 wt. % to approximately 90 wt. % of the polymer matrix forming the polymer thin film or fiber. Additives may have good solubility in, and may be index matched with, high molecular weight polyethylene, high density polyethylene, or ultra-high molecular weight polyethylene.

Example additives may include one or more of hydrocarbon waxes, e.g., polyethylene-wax molecules or amide waxes, mineral oils, fluoropolymers, etc. If used, polyethylene-wax molecules may have a molecular weight of at least approximately 400 g/mol, e.g., 400, 1000, 2000, or 3000 g/mol, including ranges between any of the foregoing values. The wax content may be at least approximately 2 wt. %, e.g., 2, 5, 10, 20, 50, or 80 wt. %, including ranges between any of the foregoing values. Suitable mineral oils may have a molecular weight of at least approximately 200 g/mol, e.g., 200, 400, or 600 g/mol, including ranges between any of the foregoing values. In some embodiments, up to approximately 1000 ppm (e.g., 200, 400, 600, 800, or 1000 ppm) of a fluoropolymer or other processing aid may be incorporated into the polymer matrix. An additive may be characterized by a refractive index of approximately 1.5 to approximately 1.6, e.g., 1.55.

In some embodiments, an additive incorporated into the polymer matrix may include a photothermal dye. Example photothermal dyes include 2-(2H-benzotriazol-2-yl)-4,6-di-tert-pentylphenol (BZT), azobenzene, coronatine dye, graphene, quaterrylene-based dyes, and metal nanoparticles such as gold nanoparticles, as well as mixtures thereof. A photothermal dye such as azobenzene or metal nanoparticles may be functionalized by ethylene oligomers having a molecular weight of at least approximately 500 g/mol, e.g., 500, 1000, 2000, or 3000 g/mol, including ranges between any of the foregoing values. In some examples, a concentration of a photothermal additive within the polymer matrix may be at least approximately 0.5 wt. %, e.g., 0.5, 1, 2, or 5 wt. %, including ranges between any of the foregoing values. A functionalized photothermal dye may be added to polyethylene prior to or during formation of a thin film, which may be stretched to form a dichroic arrangement of dye in the polyethylene matrix.

In some embodiments, optical and mechanical properties may be specifically targeted, and the polymer thin film may contain approximately 60 wt. % to approximately 90 wt. % of a low molecular weight polyethylene or polyethylene oligomer. In some embodiments, thermal conductivity may be specifically targeted, and the polymer thin film may contain approximately 1 wt. % to approximately 10 wt. % of a low molecular weight polyethylene or polyethylene oligomer.

A thermally conductive additive may have a thermal conductivity of at least approximately 5 W/mK, e.g., 5, 10, 15, or 20 W/mK, including ranges between any of the foregoing values. Example thermally conductive additives include graphene, borophene, carbon nanotubes, silver nanowires, and metal nanoparticles, such as high aspect ratio metallic nanoparticles. According to some embodiments, the loading of a thermally conductive additive may range from approximately 0.01 wt. % to approximately 1 wt. %. By way of example, phenolic benzotriazoles can form π-π interactions with polymer chains in the polyethylene polymer and enable phonons to pass at extremely low loading amounts without affecting optical quality.

The low molecular weight additive may have a molecular weight of less than approximately 4,000 g/mol, e.g., less than approximately 4,000 g/mol, less than approximately 2,000 g/mol, less than approximately 1,000 g/mol, less than approximately 500 g/mol, or less than approximately 200 g/mol. An example low molecular weight additive may be characterized by a melting temperature ($T_m$) of at least approximately 40° C., e.g., approximately 40° C., approximately 60° C., approximately 80° C., approximately 100° C., or approximately 120° C., including ranges between any of the foregoing values. Reference herein to a melting temperature may include reference to a temperature corresponding to the onset of melting.

Example polyethylene polymer and oligomer-based additives may include a reactive group such as vinyl, acrylate, methacrylate, epoxy, isocyanate, hydroxyl, amine, and the like. Such additives may be cured in situ, i.e., within a polymer thin film by applying one or more of heat or light, or by reaction with a suitable catalyst.

In some embodiments, plural additives may be used. According to particular embodiments, an original additive can be used during processing of a thin film (e.g., during extrusion, stretching, and/or calendaring). Thereafter, the original additive may be removed such as by washing or evaporation and replaced by a secondary additive. A secondary additive (e.g., various phenolic benzotriazoles) may be index matched to the crystalline polyethylene polymer and may, for example, have a refractive index ranging from approximately 1.45 to approximately 1.6. A secondary additive can be added by soaking the thin film under melting conditions or in a solvent bath. A secondary additive may have a melting point of less than approximately 100° C.

A secondary additive, if used, may be a poor solvent to polyethylene. Example poor solvents may include stearic acid or saturated hydrocarbons such as mineral oils (e.g., Kaydol® mineral oil, paraffin oil, Primol™ oil, and the like). The secondary additive may be removed before, during, or after a film stretching process such as by evaporation or solvent exchange.

The presently disclosed polyethylene thin films may be characterized as optical quality polymer thin films and may form, or be incorporated into, an optical element. Such optical elements may be used in various display devices, such as virtual reality (VR) and augmented reality (AR) glasses and headsets. The efficiency of these and other optical elements may depend on the degree of optical clarity and/or one or more mechanical properties of the polymer thin film.

According to various embodiments, an "optical quality polymer thin film" or an "optical thin film" may, in some examples, be characterized by transmissivity within the visible light spectrum of at least approximately 20%, e.g., 20, 30, 40, 50, 60, 70, 80, 90 or 95%, including ranges between any of the foregoing values, and less than approximately 10% bulk haze, e.g., 0, 1, 2, 4, 6, or 8% bulk haze, including ranges between any of the foregoing values.

A material or element that is "transparent" or "optically transparent" may, for a given thickness, have a transmissivity within the visible light spectrum of at least approximately 80%, e.g., approximately 80, 90, 95, 97, 98, 99, or 99.5%, including ranges between any of the foregoing values, and less than approximately 5% bulk haze, e.g., approximately 0.1, 0.2, 0.5, 1, 2, or 5% bulk haze, including ranges between any of the foregoing values. Transparent materials will typically exhibit very low optical absorption and minimal optical scattering.

As used herein, the terms "haze" and "clarity" may refer to an optical phenomenon associated with the transmission of light through a material, and may be attributed, for example, to the refraction of light within the material, e.g., due to secondary phases or porosity and/or the reflection of light from one or more surfaces of the material. As will be appreciated by those skilled in the art, haze may be associated with an amount of light that is subject to wide angle scattering (i.e., at an angle greater than 2.5° from normal) and a corresponding loss of transmissive contrast, whereas clarity may relate to an amount of light that is subject to narrow angle scattering (i.e., at an angle less than 2.5° from normal) and an attendant loss of optical sharpness or "see through quality."

After extrusion or casting, a polyethylene film can be oriented either uniaxially or biaxially as a single layer or multilayer to form a mechanically anisotropic and optically clear film that may exhibit anisotropy also in its thermal conductivity. An anisotropic polymer thin film may be formed using a thin film orientation system configured to heat and stretch a polymer thin film in at least one in-plane direction in one or more distinct regions thereof. In some embodiments, a thin film orientation system may be configured to stretch a polymer thin film, i.e., a crystallizable polymer thin film, along only one in-plane direction. For instance, a thin film orientation system may be configured to apply an in-plane stress to a polymer thin film along the x-direction while allowing the thin film to relax along an orthogonal in-plane direction (e.g., along the y-direction). As used herein, the relaxation of a polymer thin film may, in certain examples, accompany the absence of an applied stress along a relaxation direction.

According to some embodiments, within an example orientation system, a polymer thin film may be heated and stretched transversely to a direction of film travel through the system. In such embodiments, a polymer thin film may be held along opposing edges by plural movable clips slidably disposed along a diverging track system such that the polymer thin film is stretched in a transverse direction (TD) as it moves along a machine direction (MD) through heating and deformation zones of the thin film orientation system. In some embodiments, the stretching rate in the transverse direction and the relaxation rate in the machine direction may be independently and locally controlled. In certain embodiments, large scale production may be enabled, for example, using a roll-to-roll manufacturing platform.

In certain aspects, the tensile stress may be applied uniformly or non-uniformly along a lengthwise or widthwise dimension of the polymer thin film. Heating of the polymer thin film may accompany the application of the tensile stress. For instance, a semi-crystalline polymer thin film may be heated to a temperature greater than room temperature (~23° C.) to facilitate deformation of the thin film and the formation and realignment of crystals and/or polymer chains therein.

The temperature of the polymer thin film may be maintained at a desired value or within a desired range before, during and/or after the act of stretching, i.e., within a pre-heating zone or a deformation zone downstream of the pre-heating zone, in order to improve the deformability of the polymer thin film relative to an un-heated polymer thin film. The temperature of the polymer thin film within a deformation zone may be less than, equal to, or greater than the temperature of the polymer thin film within a pre-heating zone.

In some embodiments, the polymer thin film may be heated to a constant temperature throughout the act of stretching. In some embodiments, a region of the polymer thin film may be heated to different temperatures, i.e., during and/or subsequent to the application of a tensile stress. In some embodiments, different regions of the polymer thin film may be heated to different temperatures. In certain embodiments, the strain realized in response to the applied tensile stress may be at least approximately 20%, e.g., approximately 20%, approximately 50%, approximately 100%, approximately 200%, approximately 400%, approximately 500%, approximately 1000%, approximately 2000%, approximately 3000%, or approximately 4000% or more, including ranges between any of the foregoing values.

The crystalline content within the polymer thin film may increase during the act of stretching. In some embodiments, stretching may alter the orientation of crystals within a polymer thin film without substantially changing the crystalline content.

In some embodiments, a protective layer may be formed over one or both major surfaces of a polymer thin film. The protective layer(s) may include an organic or an inorganic material, and may shield the polymer thin film against surface damage or debris, such as scratches or dust. The protective layer(s), if provided, may be removed prior to one or more acts of stretching, or the protective layer(s) may be removed following stretching. In various examples, the removable protective layer(s) may have a 90° peel strength of at least approximately 10 g/cm width (e.g., 10, 20, 50, 100, 200, 500, 1000 g/cm width or greater).

Following the act(s) of stretching, one or more thin film or fiber properties may be refined through hot pressing or hot calendaring. Uniaxial hot pressing, for example, may be performed in a rigid die with loading applied along a common axis. Some pressing systems may include a graphite die, which may be enclosed in a protective atmosphere or vacuum chamber. During hot pressing, temperature and pressure may be applied simultaneously to the stretched polymer thin film. Heating may be achieved using induction coils that surround the graphite die, and pressure may be applied hydraulically. Calendaring is a process of compressing a thin film during production by passing a polymer thin film between one or more pairs of heated rollers.

In some embodiments, a stretched polymer thin film may be pressed or calendared to at least approximately 50% of its initial thickness (e.g., 50%, 60%, 70%, or 80% of its initial thickness, including ranges between any of the foregoing values) under an applied pressure of at least approximately 2 MPa (e.g., 2, 3, 4, 5, or 10 MPa, including ranges between any of the foregoing values) and at a temperature of less than approximately 140° C. (e.g., 120° C., 125° C., 130° C., or 135° C., including ranges between any of the foregoing values).

A pressed or calendared polymer thin film may have a thickness of less than approximately 500 micrometers, e.g., less than 400 micrometers, less than 300 micrometers, or less than 200 micrometers. According to some embodiments, following hot pressing or hot calendaring, a polymer thin film may be stretched further using one or more additional stretching steps. In a post-hot pressing or post-hot calendaring stretching step, a polymer thin film may be stretched to a draw ratio of approximately 5 or greater (e.g., 5, 10, 20, 40, 60, 80, 100, 120, or 140, including ranges between any of the foregoing values).

Hot pressing or hot calendaring may increase transmissivity and/or thermal conductivity of a polymer thin film. According to some embodiments, the applied pressure may collapse voids within the polymer thin film, thus decreasing the overall void volume and increasing the density of the polymer matrix.

Following deformation of the polymer thin film, the heating may be maintained for a predetermined amount of time, followed by cooling of the polymer thin film. The act of cooling may include allowing the polymer thin film to cool naturally, at a set cooling rate, or by quenching, such as by purging with a low temperature gas, which may thermally stabilize the polymer thin film.

Following deformation, the crystals or chains may be at least partially aligned with the direction of the applied tensile stress. As such, a polymer thin film may exhibit a high degree of optical clarity and mechanical anisotropy, including one or any combination of: transmissivity within the visible spectrum (380-750 nm) of at least approximately 80% (e.g., 80, 90, 95, 97, or 99%, including ranges between any of the foregoing values), bulk haze of less than approximately 5% (e.g., 0, 1, 2, 3, 4, or 5%, including ranges between any of the foregoing values), a Young's modulus of at least approximately 30 GPa (e.g., 30, 40, 50, 60, 70, 80, 90, or 100 GPa, including ranges between any of the foregoing values), tensile strength of at least approximately 0.5 GPa (e.g., 0.5, 1, or 1.5 GPa, including ranges between any of the foregoing values), thermal conductivity of at least approximately 5 W/mK (e.g., 5, 10, 20, 30, 40, 50, 60, 70, or 80 W/mK, including ranges between any of the foregoing values), void volume of less than approximately 25% (e.g., 0, 1, 2, 3, 4, 5, 10, 15, 20, or 25%, including ranges between any of the foregoing values) and an average void size of less than approximately 100 nm (e.g., 10, 20, 50, or 100 nm, including ranges between any of the foregoing values). In some embodiments, the modulus of a polymer thin film may be invariant or substantially invariant as a function of frequency (e.g., over a range of 0.1 to 100 Hz, for example). These and other properties may exhibit an in-plane anisotropy ranging from approximately 2:1 to approximately 100:1 or more, e.g., 2:1, 3:1, 4:1, 5:1, 10:1, 20:1, 50:1, or 100:1.

Polyethylene thin films may include fibrous, amorphous, partially crystalline, or wholly crystalline materials. Such materials may also exhibit anisotropy with respect to one or more further characteristics, which may include compressive strength, shear strength, yield strength, stiffness, hardness, toughness, ductility, machinability, thermal expansion, and creep behavior.

In further embodiments, an optical quality polyethylene thin film may be incorporated into a multilayer structure, such as the "A" layer in an ABAB multilayer. Further multilayer architectures include AB, ABA, or ABC configurations. Each B layer (and each C layer, if provided) may include a further polymer composition or other material layer.

In a single layer or multilayer architecture, a polyethylene layer may have a thickness ranging from approximately 100 nm to approximately 5 mm, e.g., 100, 200, 500, 1000, 2000, 5000, 10000, 20000, 50000, 100000, 200000, 500000, 1000000, 2000000, or 5000000 nm, including ranges between any of the foregoing values. A total multilayer stack may include two or more such layers.

According to some embodiments, the areal dimensions (i.e., length and width) of a polyethylene thin film may independently range from approximately 5 cm to approximately 50 cm or more, e.g., 5, 10, 20, 30, 40, or 50 cm, including ranges between any of the foregoing values. Example anisotropic polymer thin films may have areal dimensions of approximately 5 cm×5 cm, 10 cm×10 cm, 20 cm×20 cm, 50 cm×50 cm, 5 cm×10 cm, 10 cm×20 cm, 10 cm×50 cm, etc.

Aspects of the present disclosure thus relate to the formation of mechanically anisotropic and optically clear polyethylene single layer and multilayer polymer thin films having improved thermal, mechanical, and optical properties.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-9, a detailed description of example anisotropic polymer thin films and their methods of manufacture. The discussion associated with FIGS. 1-7 relates to example polymer thin film stretching paradigms and associated stretching apparatus. The discussion associated with FIGS. 8 and 9 relates to exemplary virtual reality and augmented reality devices that may include one or more anisotropic polymer thin films.

In conjunction with various embodiments, a polymer thin film may be described with reference to three mutually orthogonal axes that are aligned with the machine direction (MD), the transverse direction (TD), and the normal direction (ND) of a thin film orientation system, and which may correspond respectively to the length, width, and thickness dimensions of the polymer thin film. Throughout various embodiments and examples of the instant disclosure, the machine direction may correspond to the y-direction of a polymer thin film, the transverse direction may correspond to the x-direction of the polymer thin film, and the normal direction may correspond to the z-direction of the polymer thin film.

Referring to FIG. 1, shown schematically is an orthogonal consecutive stretching (OSC) system 100 and a corresponding method where a polymer thin film 105 may be first stretched in the machine direction (MD) and then stretched in the transverse direction (TD). In the illustrated embodiment, polymer thin film 105 may be initially secured between opposing clip arrays 110, 120. The inter-clip spacing 115 within clip array 110 and the inter-clip spacing 125 within clip array 120 may be independently controlled. Thus, throughout a stretching process, an inter-clip spacing along different axes of orthogonal consecutive stretching (OSC) system 100 may decrease, increase, or be held constant. According to various embodiments, stretching of the polymer thin film 105 in the machine direction and stretching of the polymer thin film 105 in the transverse direction may occur simultaneously and/or successively.

By way of example, and referring still to FIG. 1, cast polymer thin film 105 may be stretched in a first stretching step along a first axis, cooled and optionally cut to a desired width, and then stretched in a second stretching step. A temperature of the polymer thin film during the second stretching step may be at least approximately 5° C. greater than a temperature of the polymer thin film during the first stretching step (e.g., approximately 5° C., approximately 10° C., approximately 15° C., or approximately 20° C. greater, including ranges between any of the foregoing values).

During a second stretching step, the polymer thin film may be stretched along the first axis or, as illustrated in FIG. 1, along a second axis perpendicular to the first axis. The draw ratio during the second stretching step may be at least approximately 7, e.g., approximately 7, approximately 10, approximately 20, approximately 30, approximately 40, or more, including ranges between any of the foregoing values. In some embodiments, the draw ratio during the first stretching step may be less than the draw ratio during the second stretching step. By way of example, a draw ratio during the first stretching step may be less than approximately 4, e.g., approximately 3, or approximately 2, including ranges between any of the foregoing values. Following the second stretching step, the polymer thin film may be heated to increase its crystalline content.

Prior to the acts of stretching, a polymer thin film may be pre-aligned, i.e., with respect to the stretch axes of a thin film orientation system. Pre-alignment of the polymer thin film may allow polymer chains within the polymer thin film to form a cross-linked crystal network. This cross-linked crystal network may allow the polymer film to be stretched to higher draw ratios compared to thin films that are stretched only in a single direction and without pre-alignment.

Referring still to FIG. 1, heaters 130, 135 may be respectively located above and below the plane of polymer thin film 105, and may be configured to control a temperature of the polymer thin film during the acts of stretching. Heaters 130, 135 may include hot air blowers, for example. A temperature of a polymer thin film may be constant or substantially constant during one or more acts of stretching. Alternatively, a temperature of a polymer thin film may increase or decrease throughout stretching processes. Example temperatures may be greater than the polymer's glass transition temperature ($T_g$) but less than an onset temperature for melting ($T_m$).

During a first stretching process, an inter-clip spacing 150 within clip array 110 may increase, while an inter-clip spacing 145 within clip array 120 may be fixed. A tensile stress may be applied to the polymer thin film 105 along the machine direction while the polymer thin film is unstressed along the transverse direction, thus forming a uniaxially stretched polymer thin film 140. During a second and subsequent stretching process, an inter-clip spacing 155 within clip array 120 may increase, while an inter-clip spacing 160 within clip array 110 may be fixed. Thus, a tensile stress may be applied to the polymer thin film 140 along the transverse direction while the polymer thin film is unstressed along the machine direction, thus forming an OCS processed polymer thin film 165.

Figure 2:
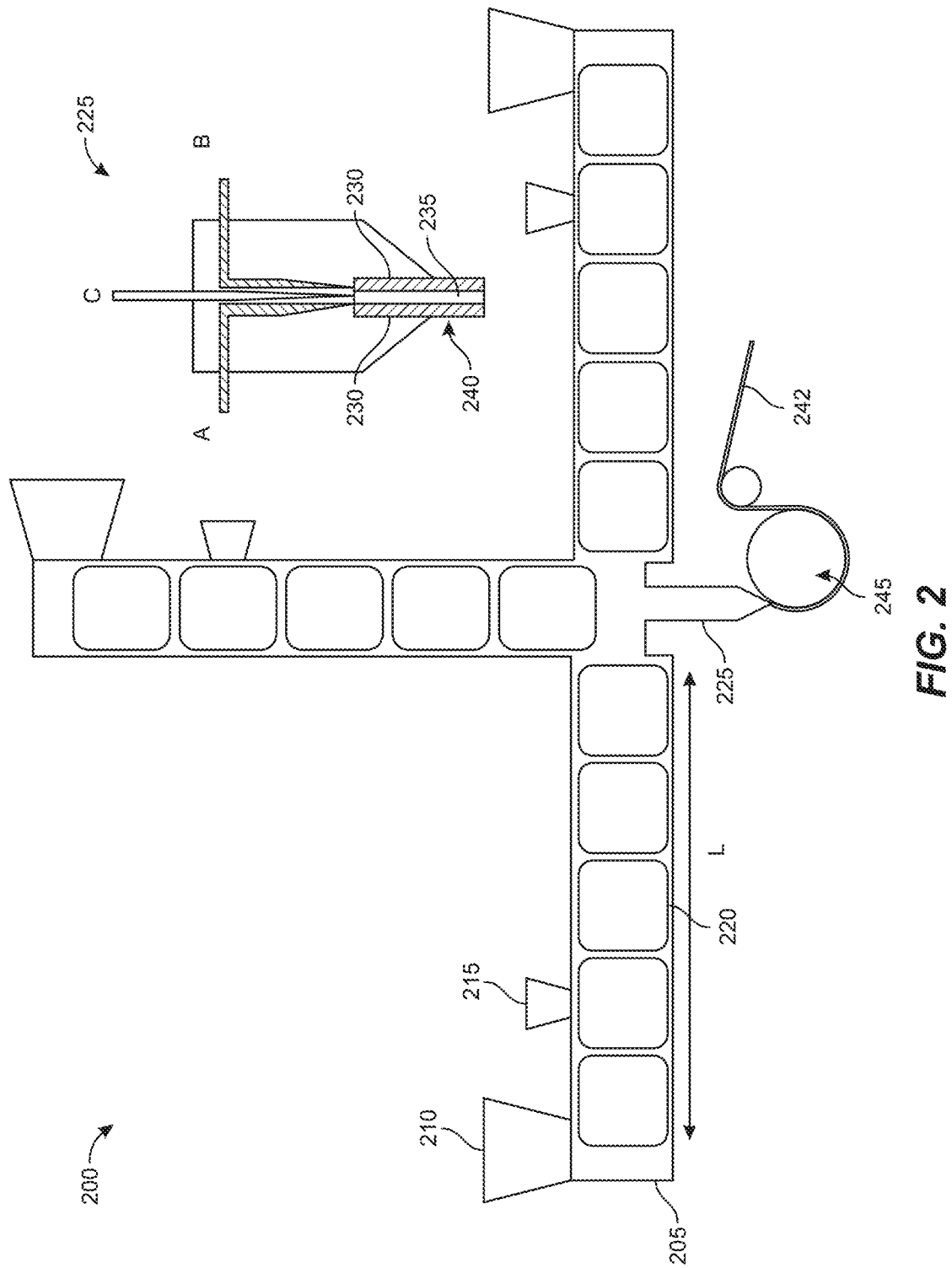
FIG. 2 is a schematic illustration of an extrusion system for forming a polymer thin film according to certain embodiments.

Referring now to FIG. 2, shown schematically is an example extrusion system for forming a cast polymer thin film. An extrusion system 200 may be configured to form a single layer polymer thin film or, as shown in the illustrated embodiment, a multilayer polymer thin film from plural sources. Different sources of feedstock may differ compositionally, for example. Multilayer polymer thin films may include 2 or more layers, where individual layers may be formed simultaneously in situ or aggregated to form a multilayer having, for example, 4, 8, 16, 32, 64, 128, 256, 512, or a greater number of individual layers.

During operation, a resin typically provided in powder or pellet form may be fed into extruder 205 from a hopper 210. One or more optional additives may be blended with the resin within hopper 210 or incorporated using a separate downstream hopper 215. The temperature of extruder 205 along its length (L) may be controlled by heating elements 220. Extruder 205 may include a screw or other element (not shown) for mixing, homogenizing, and driving feedstock from hoppers 210, 215 to an extrusion die 225.

As shown in the inset, extrusion die 225 may include plural inputs A, B, C, that are configured to receive feedstock from plural respective extruders (e.g., extruder 205, etc.). In some embodiments, the temperature of the extrusion die 225 may be greater than the melting point of the feedstock. The melted feedstock may be output through extrusion die 225 to form a multilayer thin film 240 that may include, for example, a central layer 235 and a pair of outer layers 230 that sandwich the central layer 235. Central layer 235 may include a polymer layer. Multilayer thin film 240 may be initially collected on a chilled roller 245 and output as a pre-oriented cast thin film 242. The temperature of the chilled roller 245 may be selected based on the type of additive(s) used in the process. The rotational rate of the chilled roller 245 (i.e., relative to the output rate of the extrusion die 225) may be adjusted to pre-orient multilayer thin film 240.

In some embodiments, the central layer 235 may include ultra-high molecular weight polyethylene (UHMWPE). Each outer layer 230 may include a material having a high surface energy relative to polyethylene (e.g., fluoropolymers such as polyvinylidene fluoride or polyesters such as polyethylene terephthalate) or materials having a low surface energy relative to polyethylene (e.g., polyolefins such as polypropylene).

Prior to an act of stretching, one or both of the outer layers 230 may be removed from the multilayer thin film 240. By way of example, the outer layer(s) 230 may be removed prior to stretching the central layer 235, removed after one stage of the stretching (e.g., removed after stretching along the machine direction), or removed following two stages of stretching (e.g., removed following an OCS process). In some embodiments, the outer layers 230 may be removed from the central layer 235 by peeling. In some embodiments, the outer layers 230 may have a 90° peel strength of at least approximately 10 g/cm width, e.g., 10, 20, 50, 100, 500, or 1000 g/cm width, including ranges between any of the foregoing values.

Figure 3:
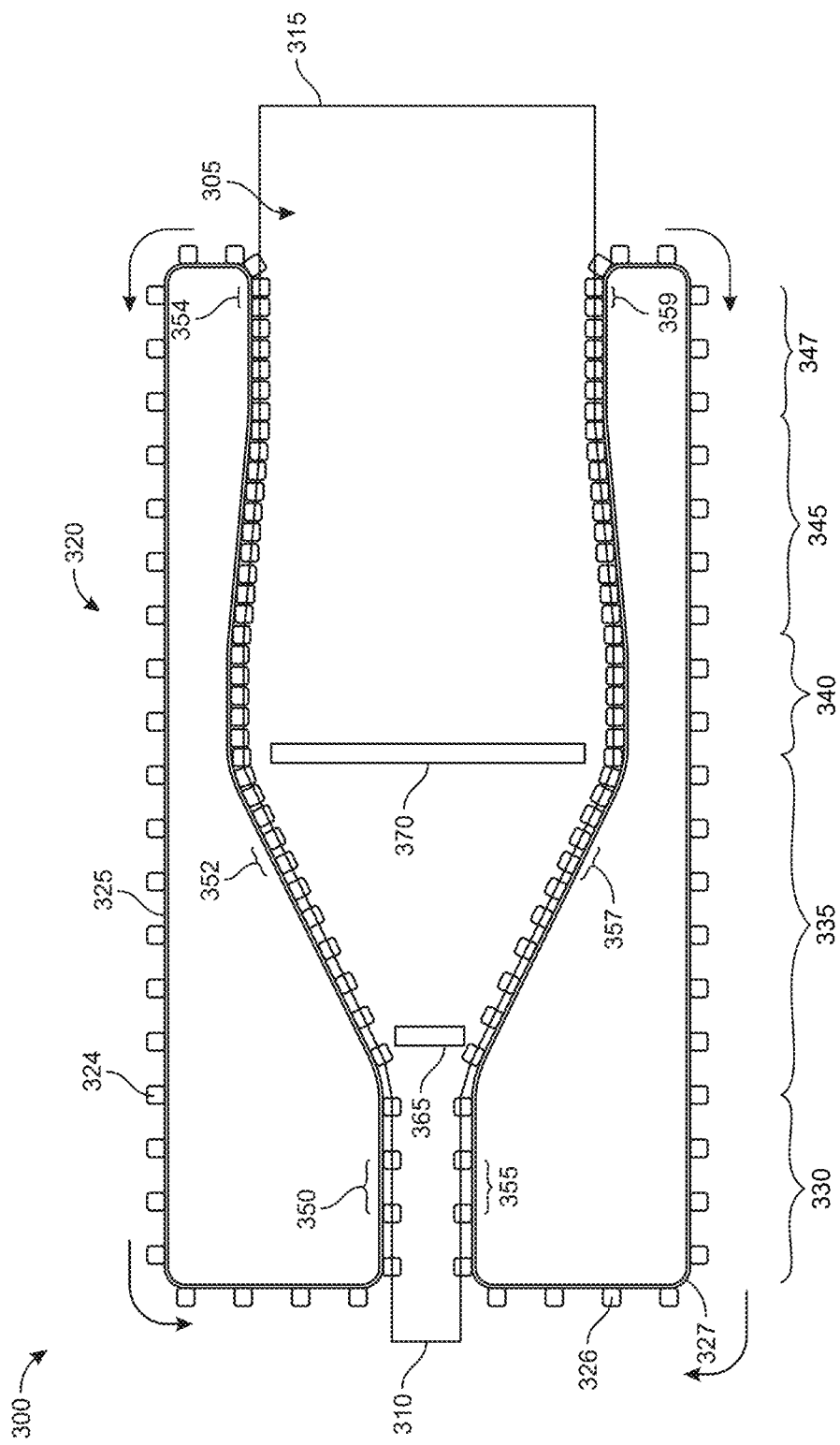
FIG. 3 is a schematic view of an example thin film orientation system for manufacturing an anisotropic polymer thin film according to some embodiments.

A single stage thin film orientation system for forming an optically anisotropic polymer thin film is shown schematically in FIG. 3. System 300 may include a thin film input zone 330 for receiving and pre-heating a crystallizable portion 310 of a polymer thin film 305, a thin film output zone 347 for outputting a crystallized and oriented portion 315 of the polymer thin film 305, and a clip array 320 extending between the input zone 330 and the output zone 347 that is configured to grip and guide the polymer thin film 305 through the system 300, i.e., from the input zone 330 to the output zone 347. Clip array 320 may include a plurality of movable first clips 324 that are slidably disposed on a first track 325 and a plurality of movable second clips 326 that are slidably disposed on a second track 327.

Polymer thin film 305 may include a single polymer layer or multiple (e.g., alternating) layers of first and second polymers, such as a multilayer ABAB . . . structure. Alternately, polymer thin film 305 may include a composite architecture having a crystallizable polymer thin film and a high Poisson's ratio polymer thin film directly overlying the crystallizable polymer thin film (not separately shown). In some embodiments, a polymer thin film composite may include a high Poisson's ratio polymer thin film reversibly laminated to, or printed on, a single crystallizable polymer thin film or a multilayer polymer thin film.

During operation, proximate to input zone 330, clips 324, 326 may be affixed to respective edge portions of polymer thin film 305, where adjacent clips located on a given track 325, 327 may be disposed at an inter-clip spacing 350, 355. For simplicity, in the illustrated view, the inter-clip spacing 350 along the first track 325 within input zone 330 may be equivalent or substantially equivalent to the inter-clip spacing 355 along the second track 327 within input zone 330. As will be appreciated, in alternate embodiments, within input zone 330, the inter-clip spacing 350 along the first track 325 may be different than the inter-clip spacing 355 along the second track 327.

In addition to input zone 330 and output zone 347, system 300 may include one or more additional zones 335, 340, 345, etc., where each of: (i) the translation rate of the polymer thin film 305, (ii) the shape of first and second tracks 325, 327, (iii) the spacing between first and second tracks 325, 327, (iv) the inter-clip spacing 350, 352, 354, 355, 357, 359, and (v) the local temperature of the polymer thin film 305, etc. may be independently controlled.

In an example process, as it is guided through system 300 by clips 324, 326, polymer thin film 305 may be heated to a selected temperature within each of zones 330, 335, 340, 345, 347. Fewer or a greater number of thermally controlled zones may be used. As illustrated, within zone 335, first and second tracks 325, 327 may diverge along a transverse direction such that polymer thin film 305 may be stretched in the transverse direction while being heated, for example, to a temperature greater than its glass transition temperature ($T_g$) but less than the onset of melting.

Referring still to FIG. 3, within zone 335 the spacing 352 between adjacent first clips 324 on first track 325 and the spacing 357 between adjacent second clips 326 on second track 327 may decrease relative to the inter-clip spacing 350, 355 within input zone 330. In certain embodiments, the decrease in clip spacing 352, 357 from the initial spacing 350, 355 may scale approximately as the square root of the transverse stretch ratio. The actual ratio may depend on the Poisson's ratio of the polymer thin film as well as the requirements for the stretched thin film, including flatness, thickness, etc. Accordingly, in some embodiments, the in-plane axis of the polymer thin films that is perpendicular to the stretch direction may relax by an amount equal to the square root of the stretch ratio in the stretch direction. By decreasing the clip spacings 352, 357 relative to inter-clip spacing 350, 355 the polymer thin film may be allowed to relax along the machine direction while being stretched along the transverse direction.

A temperature of the polymer thin film may be controlled within each heating zone. Within stretching zone 335, for example, a temperature of the polymer thin film 305 may be constant or independently controlled within sub-zones 365, 370, for example. In some embodiments, the temperature of the polymer thin film 305 may be decreased as the stretched polymer thin film 305 enters zone 340. Rapidly decreasing the temperature (i.e., thermal quenching) following the act of stretching within zone 335 may enhance the conformability of the polymer thin film 305. In some embodiments, the polymer thin film 305 may be thermally stabilized, where the temperature of the polymer thin film 305 may be controlled within each of the post-stretch zones 340, 345, 347. A temperature of the polymer thin film may be controlled by forced thermal convection or by radiation, for example, IR radiation, or a combination thereof.

Downstream of stretching zone 335, according to some embodiments, a transverse distance between first track 325 and second track 327 may remain constant or, as illustrated, initially decrease (e.g., within zone 340 and zone 345) prior to assuming a constant separation distance (e.g., within output zone 347). In a related vein, the inter-clip spacing downstream of stretching zone 335 may increase or decrease relative to inter-clip spacing 352 along first track 325 and inter-clip spacing 357 along second track 327. For example, inter-clip spacing 355 along first track 325 within output zone 347 may be less than inter-clip spacing 352 within stretching zone 335, and inter-clip spacing 359 along second track 327 within output zone 347 may be less than inter-clip spacing 357 within stretching zone 335. According to some embodiments, the spacing between the clips may be controlled by modifying the local velocity of the clips on a linear stepper motor line, or by using an attachment and variable clip spacing mechanism connecting the clips to the corresponding track.

To facilitate cross-stretch relaxation while stretching in the TD direction, the inter-clip spacings 352, 357 within stretching zone 335 may be decreased by at least approximately 20% (e.g., 20%, 30%, 40%, or 50% or more) relative to respective inter-clip spacings 350, 355 within input zone 330. The relaxation profile may be constant or variable, i.e., as a function of position, across stretching zone 335. According to some embodiments, a maximum TD draw ratio within stretching zone 335 be at least approximately 2 and less than approximately 4. The stretched and oriented polymer thin film 315 may be removed from system 300 and stretched in a further stretching step, such as via length orientation with relaxation as shown in FIG. 4.

Figure 4:
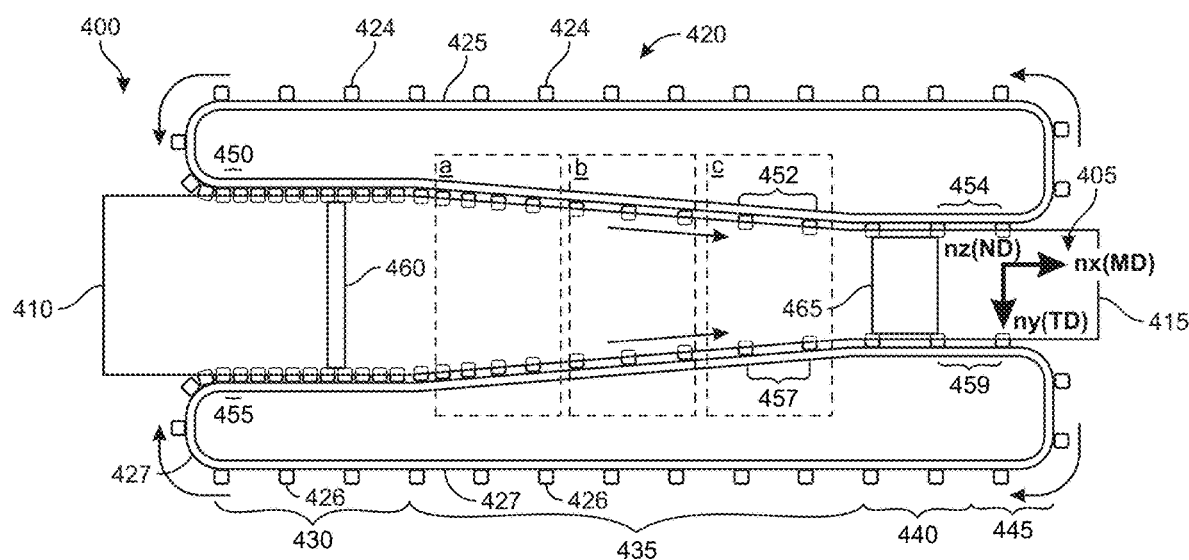
FIG. 4 is a schematic view of a thin film orientation system for manufacturing an anisotropic polymer thin film according to further embodiments.

Referring to FIG. 4, shown is a further example system for forming an anisotropic polymer thin film. Thin film orientation system 400 may include a thin film input zone 430 for receiving and pre-heating a crystalline or crystallizable portion 410 of a polymer thin film 405, a thin film output zone 445 for outputting an at least partially crystallized and oriented portion 415 of the polymer thin film 405, and a clip array 420 extending between the input zone 430 and the output zone 445 that is configured to grip and guide the polymer thin film 405 through the system 400. As in the previous embodiment, clip array 420 may include a plurality of first clips 424 that are slidably disposed on a first track 425 and a plurality of second clips 426 that are slidably disposed on a second track 427. In certain embodiments, crystalline or crystallizable portion 410 may correspond to stretched and oriented polymer thin film 315.

In an example process, proximate to input zone 430, first and second clips 424, 426 may be affixed to edge portions of polymer thin film 405, where adjacent clips located on a given track 425, 427 may be disposed at an initial inter-clip spacing 450, 455, which may be substantially constant or variable along both tracks within input zone 430. Within input zone 430 a distance along the transverse direction between first track 425 and second track 427 may be constant or substantially constant.

System 400 may additionally include one or more zones 435, 440, etc. The dynamics of system 400 allow independent control over: (i) the translation rate of the polymer thin film 405, (ii) the shape of first and second tracks 425, 427, (iii) the spacing between first and second tracks 425, 427 along the transverse direction, (iv) the inter-clip spacing 450, 455 within input zone 430 as well as downstream of the input zone (e.g., inter-clip spacings 452, 454, 457, 459), and (v) the local temperature of the polymer thin film, etc.

In an example process, as it is guided through system 400 by clips 424, 426, polymer thin film 405 may be heated to a selected temperature within each of zones 430, 435, 440, 445. A temperature greater than the glass transition temperature of a component of the polymer thin film 405 may be used during deformation (i.e., within zone 435), whereas a lesser temperature, an equivalent temperature, or a greater temperature may be used within each of one or more downstream zones.

As in the previous embodiment, the temperature of the polymer thin film 405 within stretching zone 435 may be locally controlled. According to some embodiments, the temperature of the polymer thin film 405 may be maintained at a constant or substantially constant value during the act of stretching. According to further embodiments, the temperature of the polymer thin film 405 may be incrementally increased within stretching zone 435. That is, the temperature of the polymer thin film 405 may be increased within stretching zone 435 as it advances along the machine direction. By way of example, the temperature of the polymer thin film 405 within stretching zone 435 may be locally controlled within each of heating zones a, b, and c.

The temperature profile may be continuous, discontinuous, or combinations thereof. As illustrated in FIG. 4, heating zones a, b, and c may extend across the width of the polymer thin film 405, and the temperature within each zone may be independently controlled according to the relationship $T_g<T_a<T_b<T_c<T_m$. A temperature difference between neighboring heating zones may be less than approximately 20° C., e.g., less than approximately 10° C., or less than approximately 5° C.

Referring still to FIG. 4, within zone 435 the spacing 452 between adjacent first clips 424 on first track 425 and the spacing 457 between adjacent second clips 426 on second track 427 may increase relative to respective inter-clip spacings 450, 455 within input zone 430, which may apply an in-plane tensile stress to the polymer thin film 405 and stretch the polymer thin film along the machine direction. Moreover, the extent of inter-clip spacing on one or both tracks 425, 427 within deformation zone 435 may be constant or variable and, for example, increase as a function of position along the machine direction.

Within stretching zone 435, the inner-clip spacings 452, 457 may increase linearly such that the primary mode of deformation may be at constant velocity. For example, a strain rate of the polymer thin film may decrease along the machine direction. In further embodiments, the polymer thin film 405 may be stretched at a constant strain-rate where the inter-clip spacing may increase exponentially.

In certain examples, a progressively decreasing strain rate may be implemented with thin film orientation system 400 to generate a high refractive index polymer thin film. For instance, within stretching zone 435 an inter-clip spacing may be configured such that a distance between each successive pair of clips 424, 426 increases along the machine direction. The inter-clip spacing between each successive pair of clips may be independently controlled to achieve a desired strain rate along the machine direction.

In response to the tensile stress applied along the machine direction, system 400 is configured to inhibit the generation of stresses and an attendant realignment of crystals along the machine direction. As illustrated, within zone 435, first and second tracks 425, 427 may converge along a transverse direction such that polymer thin film 405 may relax in the transverse direction while being stretched in the machine direction. Using a single stretching step or multiple stretching steps, polymer thin film 405 may be stretched by a factor of at least approximately 4 (e.g., 4, 5, 6, 7, 8, 9, 10, 20, 40, 100, or more, including ranges between any of the foregoing values).

Within stretching zone 435, an angle of inclination of first and second tracks 425, 427 (i.e., with respect to the machine direction) may be constant or variable. In particular examples, the inclination angle within stretching zone 435 may decrease along the machine direction. That is, according to certain embodiments, the inclination angle within heating zone a may be greater than the inclination angle within heating zone b, and the inclination angle within heating zone b may be greater than the inclination angle within heating zone c. Such a configuration may be used to provide a progressive decrease in the relaxation rate (along the transverse direction) within the stretching zone 435 as the polymer thin film advances through system 400.

In some embodiments, the temperature of the polymer thin film 405 may be decreased as the stretched polymer thin film 405 exits zone 435. In some embodiments, the polymer thin film 405 may be thermally stabilized, where the temperature of the polymer thin film 405 may be controlled within each of the post-deformation zones 440, 445. A temperature of the polymer thin film may be controlled by forced thermal convection or by radiation, for example, IR radiation, or a combination thereof.

Downstream of deformation zone 435, the inter-clip spacing may increase or remain substantially constant relative to inter-clip spacing 452 along first track 425 and inter-clip spacing 457 along second track 427. For example, inter-clip spacing 455 along first track 425 within output zone 445 may be substantially equal to the inter-clip spacing 452 as the clips exit zone 435, and inter-clip spacing 459 along second track 427 within output zone 445 may be substantially equal to the inter-clip spacing 457 as the clips exit zone 435. Following the act of stretching, polymer thin film 405 may be annealed, for example, within one or more downstream zones 440, 445.

The strain impact of the thin film orientation system 400 is shown schematically by unit segments 460, 465, which respectively illustrate pre- and post-deformation dimensions for a selected area of polymer thin film 405. In the illustrated embodiment, polymer thin film 405 has a pre-stretch width (e.g., along the transverse direction) and a pre-stretch length (e.g., along the machine direction). As will be appreciated, a post-stretch width may be less than the pre-stretch width and a post-stretch length may be greater than the pre-stretch length.

In some embodiments, a roll-to-roll system may be integrated with a thin film orientation system, such as thin film orientation system 300 or thin film orientation system 400, to manipulate a polymer thin film. In further embodiments, as illustrated herein with reference FIG. 5, a roll-to-roll system may itself be configured as a thin film orientation system.

Figure 5:
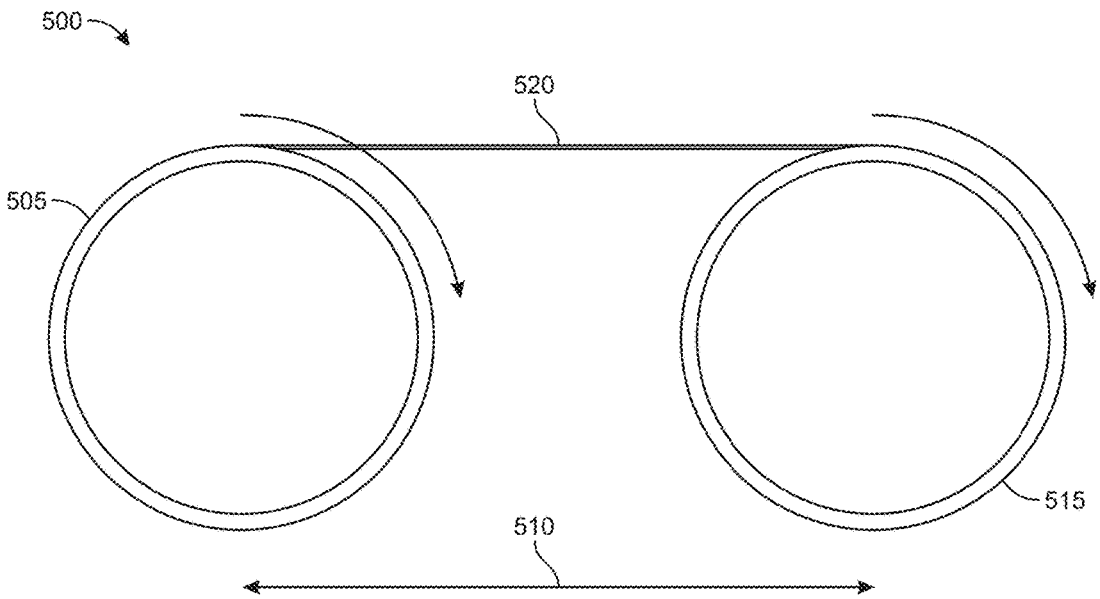
FIG. 5 illustrates a roll-to-roll manufacturing configuration for conveying and orienting a polymer thin film according to certain embodiments.

An example roll-to-roll polymer thin film orientation system is depicted in FIG. 5. In conjunction with system 500, a method for stretching a polymer thin film 520 may include mounting the polymer thin film between linear rollers 505, 515 and heating a portion of the polymer thin film located between the rollers 505, 515 to a temperature greater than its glass transition temperature. Rollers 505, 515 may be arranged with a controllable spacing 510 therebetween. A heat source (not shown), such as an IR source optionally equipped with an IR reflector, may be used to heat the polymer thin film 520 within a deformation region between the rollers.

While controlling the temperature of the polymer thin film, rollers 505, 515 may be engaged and the polymer thin film may be stretched. For instance, first roller 505 may rotate at a first rate and second roller 515 may rotate at a second rate greater than the first rate to stretch the polymer thin film along a machine direction therebetween. Within a deformation zone between rollers, system 500 may be configured to locally control the temperature and the strain rate of the polymer thin film. In some examples, as the polymer thin film advances from roller 505 to roller 515, a temperature of the polymer thin film may increase, and a strain rate of the polymer thin film may decrease. Downstream of roller 515, the polymer thin film may then be cooled while maintaining the applied stress. System 500 may be used to form a uniaxially oriented polymer thin film. Additional rollers may be added to system 500 to control the conveyance and take-up of the polymer thin film.

Figure 6:
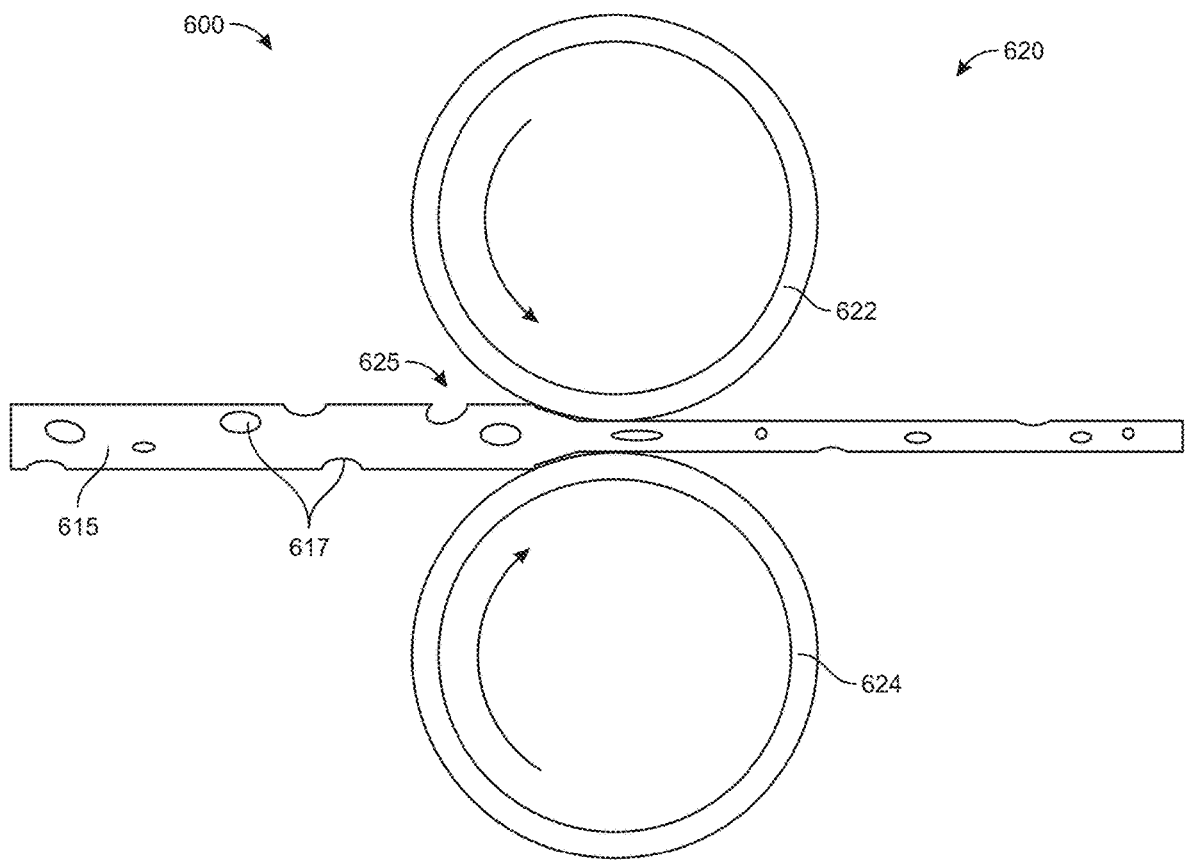
FIG. 6 illustrates a calendaring method for manufacturing a polymer thin film according to some embodiments.

Referring to FIG. 6, shown schematically is a calendaring method for manufacturing an anisotropic polymer thin film. In method 600, a stretched polyethylene thin film 615, such as oriented polymer thin film 315 or oriented polymer thin film 415, may be fed into a calendaring system 620. Calendaring system 620 may include a pair of counter-rotating rollers 622, 624 defining a nip region 625. As the thin film 615 passes into the nip region 625 and between the rollers 622, 624, the thin film 615 may be compressed. In exemplary embodiments, rollers 622, 624 may be heated. In some examples, the temperature of the rollers during calendaring may be greater than the glass transition temperature of the polymer. In some examples, the temperature of the rollers during calendaring may be less than, equal to, or greater than the melting onset temperature of the polymer.

During calendaring, voids 617 present in stretched polyethylene thin film 615 may be compressed, and the overall void fraction within the thin film may be decreased. Moreover, voids exposed at a surface of the thin film may be smoothed, resulting in decreased surface roughness and, together with compression of voids within the bulk of the thin film, higher transmissivity and higher thermal conductivity.

Figure 7:
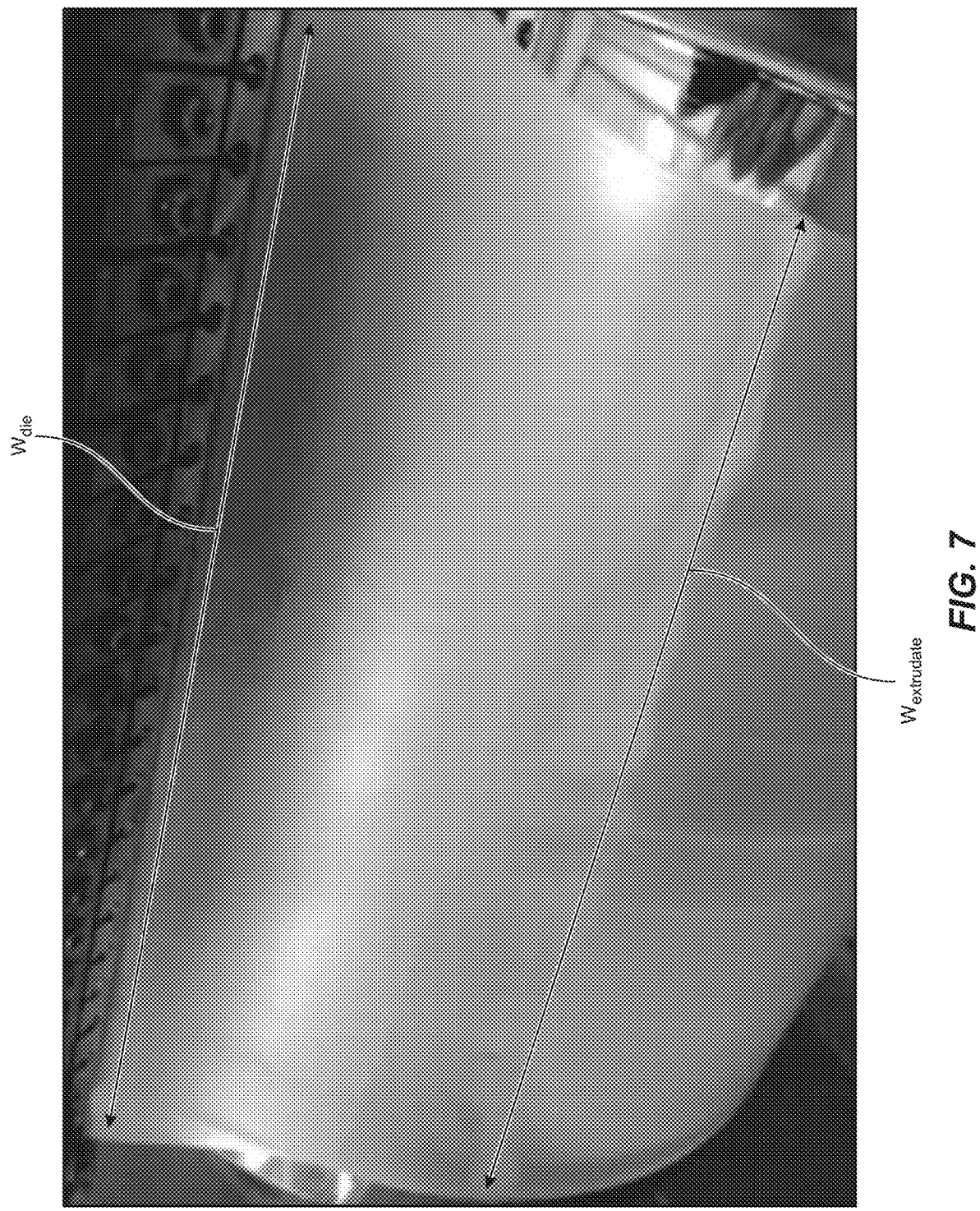
FIG. 7 is an optical micrograph of a cast polymer thin film depicting the pre-orientation of the cast film as a function of a draw down ratio (DDR) according to some embodiments.

Turning to FIG. 7, a pre-orientation of a cast polymer film may be characterized by a draw down ratio (DDR), which may be defined as $(W_{die} \cdot t_{die})/(W_{extrudate} \cdot t_{extrudate})$, where $W_{die}$ and $t_{die}$ are the width and thickness of the melt at the die exit, and $W_{extrudate}$ and $t_{extrudate}$ are the width and thickness of the extruded polymer thin film.

As disclosed herein, high modulus and high yield strength polymer thin films and fibers including ultrahigh molecular weight polyethylene (UHMWPE) may be manufactured using successive casting and drawing operations. To create a desired form factor, casting may include melt extrusion, compression molding, gel casting, calendaring, and the like.

A polymer thin film may include a single layer or a multilayer structure, for example. One or more subsequent drawing steps may include heating and stretching the polymer to induce chain realignment and an attendant improvement in optical and thermomechanical properties, including transparency, refractive index, birefringence, elastic modulus, processability, etc.

In particular embodiments, an orthogonal consecutive stretching (OSC) method may be used during the drawing operation, where the polymer is initially stretched along a first axis and subsequently stretched along a second axis orthogonal to the first axis. Applicants have shown that orthogonal consecutive stretching may facilitate the development of desired structural attributes in the resulting thin film or fiber, including a small lamellar thickness and a high degree of polymer chain orientation, which may be achievable at lesser draw ratios than needed with single stretching methods or even parallel consecutive stretching approaches.

During an OSC method, the polymer temperature may be greater than its glass transition temperature, and the strain rate may be constant or variable. In some embodiments, during stretching along one direction, the polymer material may be constrained or unconstrained along one or both directions orthogonal to the stretching direction. That is, the rate of relaxation of the polymer in non-stretch directions may be controlled or allowed to relax freely. Calendaring (or hot pressing) may decrease void volume in the stretched polymer thin films and improve one or more of optical transparency and thermal conductivity.

In contrast to uncontrolled reorientation methods where a polymer thin film can relax only near a free edge and hence exhibit uniaxial performance only in a limited area, i.e., near the edge, the controlled reorientation method disclosed herein allows a polymer thin film to achieve a significantly higher degree of (uniform) orientation across an in-plane direction (e.g., width) and thus uniaxial performance over a larger area.

EXAMPLE EMBODIMENTS

Example 1: A method includes applying a first stress to a polymer thin film to stretch the polymer thin film along a first in-plane direction, and applying a second stress to the polymer thin film to stretch the polymer thin film along a second in-plane direction orthogonal to the first in-plane direction to form an anisotropic polymer thin film having an elastic modulus along at least one in-plane direction of at least approximately 30 GPa.

Example 2: The method of Example 1, where the first stress is applied prior to the second stress.

Example 3: The method of any of Examples 1 and 2, where the first stress and the second stress are applied simultaneously.

Example 4: The method of any of Examples 1-3, where the polymer thin film includes polyethylene having a weight-averaged molecular weight of at least approximately 100,000 g/mol.

Example 5: The method of any of Examples 1-4, including heating the polymer thin film to a temperature greater than a glass transition temperature of the polymer while applying each of the first stress and the second stress.

Example 6: The method of any of Examples 1-5, including increasing a temperature of the polymer thin film while applying at least one of the first stress and the second stress.

Example 7: The method of any of Examples 1-6, where a strain rate associated with deformation of the polymer thin film decreases while applying at least one of the first stress and the second stress.

Example 8: The method of any of Examples 1-7, further including feeding the anisotropic polymer thin film through a nip opening of a pair of counter-rotating calendar rollers to form a calendared polymer thin film.

Example 9: The method of Example 8, where the calendared polymer thin film includes a void volume of less than approximately 25% and an average void size of less than approximately 100 nm.

Example 10: A method includes forming a polymer article from an organic resin, applying a first stress to the polymer article to induce a first strain of at least approximately 100% along a first direction of the polymer article and a first relaxation ratio of at least approximately 0.2 with respect to a second direction of the polymer article orthogonal to the first direction, and applying a second stress to the polymer article to induce a second strain of at least approximately 600% along the second direction of the polymer article and a second relaxation ratio of at least approximately 0.2 with respect to the first direction of the polymer article to form a stretched polymer article.

Example 11: The method of Example 10, where the polymer article includes polyethylene having a weight-averaged molecular weight of at least approximately 100,000 g/mol.

Example 12: The method of any of Examples 10 and 11, where the organic resin includes an additive having a weight-averaged molecular weight of less than approximately 4,000 g/mol.

Example 13: The method of any of Examples 10-12, where the additive includes a wax.

Example 14: The method of any of Examples 10-13, including removing the additive from the stretched polymer article.

Example 15: The method of any of Examples 10-14, where the first strain is less than approximately 300%.

Example 16: The method of any of Examples 10-15, further including feeding the stretched polymer article through a nip opening of a pair of counter-rotating calendar rollers.

Example 17: A polymer thin film including (a) polyethylene having an average molecular weight of at least approximately 100,000 g/mol, (b) optical transmissivity within the visible spectrum of at least approximately 80%, (c) bulk haze of less than approximately 5%, (d) tensile strength of at least approximately 0.5 GPa, and (e) elastic modulus of at least approximately 30 GPa.

Example 18: The polymer thin film of Example 17, including a thermal conductivity of at least approximately 5 W/mK.

Example 19: The polymer thin film of any of Examples 17 and 18, including a void volume of less than approximately 25% and an average void size of less than approximately 100 nm.

Example 20: The polymer thin film of any of Examples 17-19, where at least one of the optical transmissivity, the bulk haze, the tensile strength, and the elastic modulus has an in-plane anisotropy of at least approximately 2:1.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
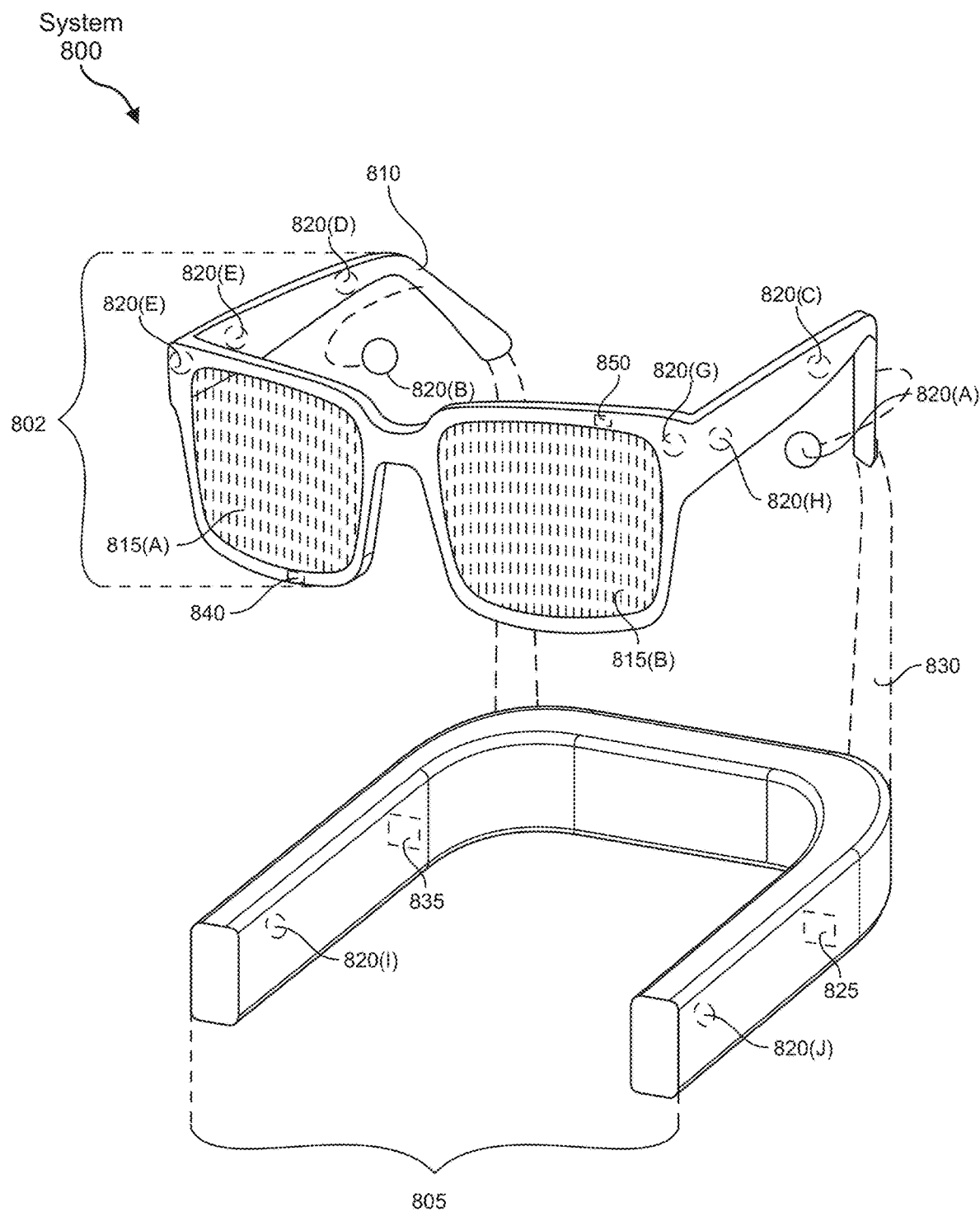
FIG. 8 is an illustration of exemplary augmented-reality glasses that may be used in connection with embodiments of this disclosure.
Figure 9:
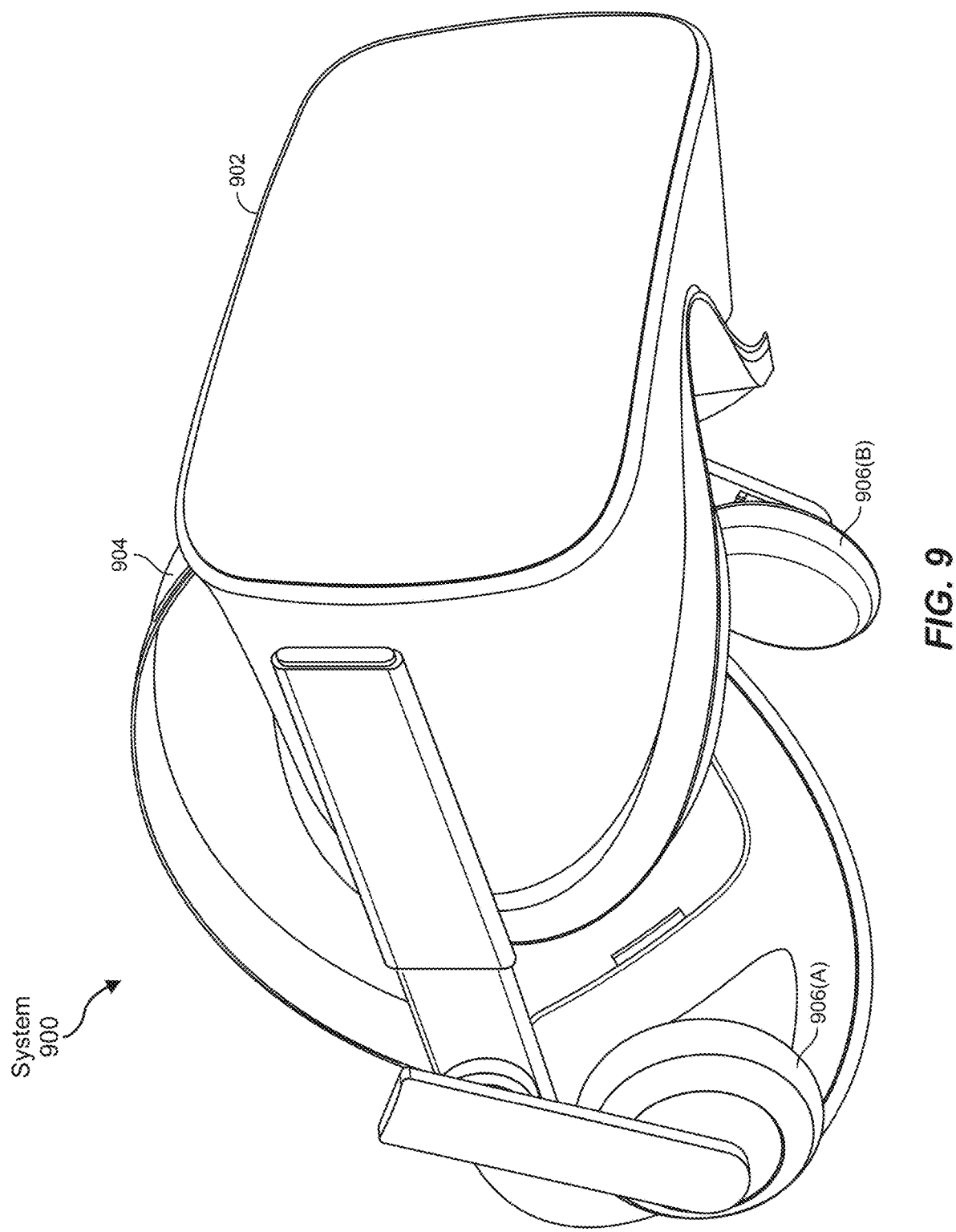
FIG. 9 is an illustration of an exemplary virtual-reality headset that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality system 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(1) and 820(J)) that are part of the microphone array (or potentially form their own microphone subarray). Neckband 805 may also include a controller 825 and a power source 835.

Acoustic transducers 820(1) and 820(J) of neckband 805 may be configured to detect sound and convert the detected sound into an electronic format (analog or digital). In the embodiment of FIG. 8, acoustic transducers 820(1) and 820(J) may be positioned on neckband 805, thereby increasing the distance between the neckband acoustic transducers 820(1) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820 (D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a polymer thin film that comprises or includes polyethylene include embodiments where a polymer thin film consists essentially of polyethylene and embodiments where a polymer thin film consists of polyethylene.

What is claimed is:

1. A method comprising:
   applying a first stress to a polymer thin film to stretch the polymer thin film along a first in-plane direction;
   applying a second stress to the polymer thin film to stretch the polymer thin film along a second in-plane direction orthogonal to the first in-plane direction to form an anisotropic polymer thin film having an elastic modulus along at least one in-plane direction of at least approximately 30 GPa; and
   feeding the anisotropic polymer thin film through a nip opening of a pair of counter-rotating calendar rollers to form a calendared polymer thin film, wherein the calendared polymer thin film comprises a void volume of less than approximately 25% and an average void size of less than approximately 100 nm.

2. The method of claim 1, wherein the first stress is applied prior to the second stress.

3. The method of claim 1, wherein the first stress and the second stress are applied simultaneously.

4. The method of claim 1, wherein the polymer thin film comprises polyethylene having a weight-averaged molecular weight of at least approximately 100,000 g/mol.

5. The method of claim 1, comprising heating the polymer thin film to a temperature greater than a glass transition temperature of the polymer while applying each of the first stress and the second stress.

6. The method of claim 1, comprising increasing a temperature of the polymer thin film while applying at least one of the first stress and the second stress.

7. The method of claim 1, wherein a strain rate associated with deformation of the polymer thin film decreases while applying at least one of the first stress and the second stress.

* * * * *